US012591764B2

(12) United States Patent
Rawat et al.

(10) Patent No.: US 12,591,764 B2
(45) Date of Patent: Mar. 31, 2026

(54) FAIRNESS ASSESSMENT FOR DEEP GENERATIVE MODELS

(71) Applicant: International Business Machines Corporation, Armonk, NY (US)

(72) Inventors: Ambrish Rawat, Dublin (IE); Jonathan Peter Epperlein, Dublin (IE); Rahul Nair, Dublin (IE); Killian Levacher, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 17/654,093

(22) Filed: Mar. 9, 2022

(65) Prior Publication Data
US 2023/0289573 A1 Sep. 14, 2023

(51) Int. Cl.
G06N 3/0475 (2023.01)
G06N 3/047 (2023.01)
G06N 20/00 (2019.01)

(52) U.S. Cl.
CPC ........... G06N 3/0475 (2023.01); G06N 3/047 (2023.01); *G06N 20/00* (2019.01)

(58) Field of Classification Search
CPC ............ G06N 3/02; G06N 3/04; G06N 3/045; G06N 3/047; G06N 3/0475; G06N 3/08;
(Continued)

(56) References Cited

U.S. PATENT DOCUMENTS

2019/0258962 A1* 8/2019 Sreekumari ............ G06N 20/10
2020/0226489 A1 7/2020 Li
(Continued)

FOREIGN PATENT DOCUMENTS

KR         102240885 B1    4/2021
KR      20210084332 A     7/2021
(Continued)

OTHER PUBLICATIONS

"Explainable AI | Fiddler AI", © 2021 Fiddler AI, 8 pages, <https://www.fiddler.ai/explainable-ai>.
(Continued)

*Primary Examiner* — Shane D Woolwine
(74) *Attorney, Agent, or Firm* — Stosch Sabo

(57) ABSTRACT
A computer-implemented method, a computer program product, and a computer system for assessing fairness of a deep generative model. A computer system receives a user defined fairness criterion for the deep generative model. A computer system probes the deep generative model to produce samples for a target output. A computer system evaluates the samples for the fairness of the deep generative model, according to the user defined fairness criterion. A computer system produces a set of recommendations for modifying the deep generative model to meet the user defined fairness criterion, in response to determining that the deep generative model does not meet the user defined fairness criterion. In response to determining that the deep generative model is to be modified, a computer system applies at least one subset of the recommendations to the deep generative model. A computer system updates the deep generative model.

20 Claims, 5 Drawing Sheets

(58) Field of Classification Search
CPC ........ G06N 3/082; G06N 20/00; G06N 20/10;
G06N 20/20
See application file for complete search history.

(56) References Cited

U.S. PATENT DOCUMENTS

| | | | | |
|---|---|---|---|---|
| 2020/0342307 | A1* | 10/2020 | Baughman | G06N 3/084 |
| 2020/0372304 | A1 | 11/2020 | Kenthapadi | |
| 2020/0380399 | A1* | 12/2020 | Weider | G06F 16/285 |
| 2021/0112101 | A1 | 4/2021 | Crabtree | |
| 2021/0158204 | A1 | 5/2021 | Natesan Ramamurthy | |
| 2021/0224605 | A1 | 7/2021 | Zhang | |
| 2021/0295170 | A1 | 9/2021 | Agrawal | |
| 2022/0114399 | A1* | 4/2022 | Castiglione | G06V 10/751 |
| 2023/0162023 | A1* | 5/2023 | Koike Akino | G06N 3/0455 |
| | | | | 706/25 |

FOREIGN PATENT DOCUMENTS

| | | | |
|---|---|---|---|
| WO | 2020146028 | A1 | 7/2020 |
| WO | 2020240981 | A1 | 12/2020 |

OTHER PUBLICATIONS

"Parity", accessed on Feb. 4, 2022, 3 pages, <https://www.getparity.ai/>.

"Reports", Weights and Biases, accessed on Feb. 4, 2022, 5 pages, <https://wandb.ai/site/reports>.

Abdal et al., "Image2StyleGAN: How to Embed Images Into the StyleGAN Latent Space?", arXiv:1904.03189v2 [cs.CV] Sep. 3, 2019, 13 pages.

Abid et al., "Persistent Anti-Muslim Bias in Large Language Models", arXiv:2101.05783v2 [cs.CL] Jan. 18, 2021, 17 pages.

Choi et al., "Fair Generative Modeling via Weak Supervision", arXiv:1910.12008v2 [cs.LG] Jun. 30, 2020, 22 pages.

Durrwachte, Bernd, "Fair AI Insights from Experts—Fair Ai", May 28, 2019, 2 pages, <https://www.fairai.uk/insights-experts>.

Esser et al., "A Note on Data Biases in Generative Models", arXiv:2012.02516v1 [cs.CV] Dec. 4, 2020, 8 pages.

Fetty et al., "Latent space manipulation for high-resolution medical image sysnthesis via the StyleGAN", Z Med Phy 30 (2020), 20 pages.

Jalal et al., "Fairness for Image Generation with Uncertain Sensitive Attributes", Proceedings of the 38th International Conference on Machine Learning, PMLR 139, 2021, 12 pages.

Kenfack et al., "On the Fairness of Generative Adversarial Networks (GANs)", arXiv:2103.00950v2 [cs.LG] May 21, 2021, 7 pages.

Liu et al., "Towards Disentangling Latent Space for Unsupervised Semantic Face Editing", arXiv:2011.02638v2 [cs.CV] Jul. 19, 2021, 10 pages.

McDuff et al., "Identifying Bias in AI using Simulation", OpenReview, ICLR 2019 Conference, 5 pages, <https://openreview.net/forum?id=BJf_YjCqYX>.

Mell et al., "The NIST Definition of Cloud Computing", NIST National Institute of Standards and Technology U.S. Department of Commerce, Special Publication 800-145, Sep. 2011, 7 pages.

Mirman et al., "Robustness Certification of Generative Models", arXiv:2004.14756v1 [cs.LG] Apr. 30, 2020, 14 pages.

Rajotte, "Reducing bias and increasing utility by federated generative modeling of medical images using a centralized adversary", arXiv:2101.07235v2 [stat.ML] Aug. 29, 2021, 20 pages.

Sattigeri et al., "Fairness GAN: Generating Datasets With Fairness Properties Using a Generative Adversarial Network", Published as a workshop paper at ICLR 2019, 12 pages.

Tan et al., "Improving the Fairness of Deep Generative Models without Retraining", arXiv:2012.04842v2 [cs.CV] Mar. 29, 2021, 24 pages.

Xu et al., "FairGAN: Fairness-aware Generative Adversarial Networks", arXiv:1805.11202v1 [cs.LG] May 28, 2018, 11 pages.

Xu et al., "FairGAN+: Achieving Fair Data Generation and Classification through Generative Adversarial Nets", 2019 IEEE International Conference on Big Data (Big Data), 6 pages.

Zhao et al., "Bias and Generalization in Deep Generative Models: An Empirical Study", 32nd Conference on Neural Information Processing Systems (NeurIPS 2018), Montreal, Canada, 10 pages.

Bisla et al. "Towards Automated Melanoma Detection with Deep Learning: Data Purification And Augmentation", In Proceedings of The IEEE/CVF Conference On Computer Vision And Pattern Recognition Workshops, Jun. 2019, 9 Pages.

* cited by examiner

FAIRNESS ASSESSMENT FOR DEEP GENERATIVE MODELS

BACKGROUND

The present invention relates generally to artificial intelligence (AI) and machine learning, and more particularly to deep generative models, AI fairness, automated artificial intelligence (AutoAI), and machine learning applications.

An application for medical diagnosis may need data such as medical records for patients or magnetic resonance imaging (MRI) images. Due to the privacy concerns and sensitivity of such data, an application developer will likely utilize a deep generative model to generate such synthetic data. However, deep generative models are often trained on limited data and require computational resource and expertise. On the other hand, deep generative models sourced from third parties may not produce data that obeys fairness criteria. For example, medical records may not be fairly produced across different groups.

SUMMARY

In one aspect, a computer-implemented method for assessing fairness of a deep generative model is provided. The computer-implemented method includes receiving a user defined fairness criterion for the deep generative model. The computer-implemented method further includes probing the deep generative model to produce samples for a target output. The computer-implemented method further includes evaluating the samples for fairness of the deep generative model, according to the user defined fairness criterion. The computer-implemented method further includes, in response to determining that the deep generative model does not meet the user defined fairness criterion, producing a set of recommendations for modifying the deep generative model to meet the user defined fairness criterion. The computer-implemented method further includes, in response to determining that the deep generative model is to be modified, applying at least one subset of the recommendations to the deep generative model. The computer-implemented method further includes updating the deep generative model.

In another aspect, a computer program product for assessing fairness of a deep generative model is provided. The computer program product comprises a computer readable storage medium having program instructions embodied therewith, and the program instructions are executable by one or more processors. The program instructions are executable to: receive a user defined fairness criterion for the deep generative model; probe the deep generative model to produce samples for a target output; evaluate the samples for fairness of the deep generative model, according to the user defined fairness criterion; in response to determining that the deep generative model does not meet the user defined fairness criterion, produce a set of recommendations for modifying the deep generative model to meet the user defined fairness criterion; in response to determining that the deep generative model is to be modified, apply at least one subset of the recommendations to the deep generative model; and update the deep generative model.

In yet another aspect, a computer system for assessing fairness of a deep generative model is provided. The computer system comprises one or more processors, one or more computer readable tangible storage devices, and program instructions stored on at least one of the one or more computer readable tangible storage devices for execution by at least one of the one or more processors. The program instructions are executable to receive a user defined fairness criterion for the deep generative model. The program instructions are further executable to probe the deep generative model to produce samples for a target output. The program instructions are further executable to evaluate the samples for fairness of the deep generative model, according to the user defined fairness criterion. The program instructions are further executable to, in response to determining that the deep generative model does not meet the user defined fairness criterion, produce a set of recommendations for modifying the deep generative model to meet the user defined fairness criterion. The program instructions are further executable to, in response to determining that the deep generative model is to be modified, apply at least one subset of the recommendations to the deep generative model. The program instructions are further executable to update the deep generative model.

DETAILED DESCRIPTION

Embodiments of the present invention disclose a system that an application developer employs to assess the fairness of a pretrained deep generative model prior to blind adoption of a pretrained model.

Fairness is a property of a pretrained deep generative model to treat all entities equally, and it may be considered for either an individual or a group. When considering for an individual, similar individuals must be treated similarly. When considering for a group, a user-specified definition of a group is used and it is ensured that model outputs are similar across groups (typically using some statistical measures). Embodiments of the present invention consider group fairness.

Figure 1:
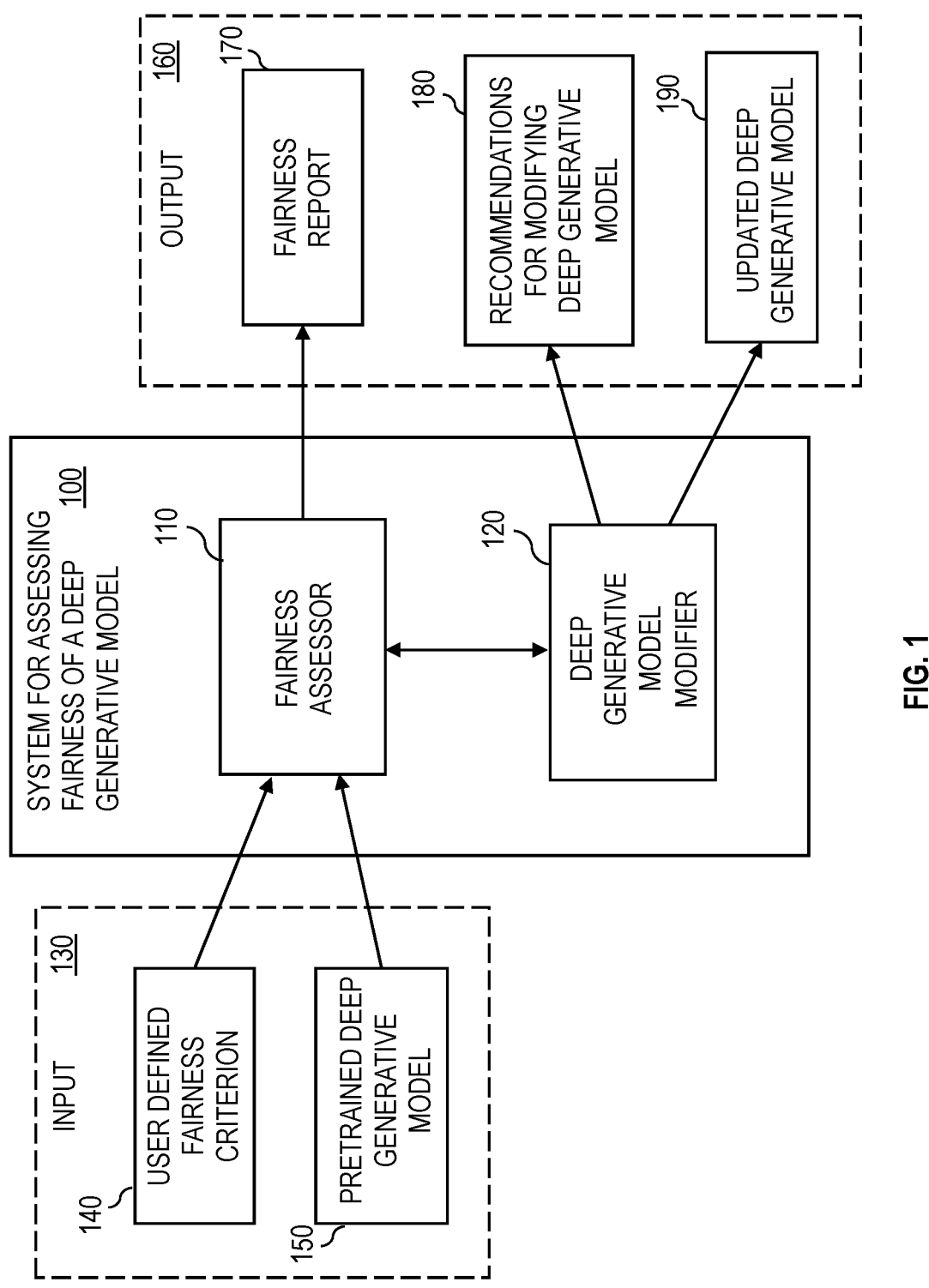
FIG. 1 is a systematic diagram illustrating a system for assessing fairness of a deep generative model, in accordance with one embodiment of the present invention.

FIG. 1 is a systematic diagram illustrating system 100 for assessing fairness of a deep generative model, in accordance with one embodiment of the present invention. System 100 is implemented on one or more computing devices or servers. A computing device or server is described in more detail in later paragraphs with reference to FIG. 3. System 100 may be implemented in a cloud computing environment. The cloud computing environment is described in more detail in later paragraphs with reference to FIG. 4 and FIG. 5.

System 100 for assessing fairness of a deep generative model includes fairness assessor 110. From input 130, fairness assessor 110 receives user defined fairness criterion 140 and pretrained deep generative model 150. Pretrained deep generative model 150 can generate synthetic samples.

For example, pretrained deep generative model 150 can produce magnetic resonance imaging (MRI) images, and pretrained deep generative model 150 can produce human portraits. To define user defined fairness criterion 140, a user specifies a fairness criterion for the synthetic samples. User defined fairness criterion 140 can be defined with respect to some protected attributes or can be specified via samples.

Pretrained deep generative model 150 can be probed to produce synthetic samples for the target output, and the obtained samples can be evaluated for fairness by using a classifier for example. In a scenario where pretrained deep generative model 150 generates synthetic samples $X\sim P_{data}$ (where $P_{data}$ is the data distribution), pretrained deep generative model 150 is trained such that, for a given latent representation $z\sim P_{sample}$ (where $P_{sample}$ is the pre-specified sample distribution), $G(z)$ obeys $P_{data}$ (where $G(z)$ is a mathematical notation of a deep generative model). The latent representation includes a noise component and can optionally include structured inputs such as labels.

A user of pretrained deep generative model 150 may specify a fairness criterion for generation of synthetic samples with respect to some protected attributes; for example, the fairness criterion requires that generation of patient records is fair across all groups of patients.

In an embodiment, a fairness criterion is a classifier-defined user criterion. A user provides an application programming interface (API) access to a classifier that can predict the distributional characteristics for the protected feature. For the purpose of simplicity, a following scenario is considered: a protected attribute t is binary ($t\in\{0,1\}$), and a classifier f: $X\rightarrow t$ can predict the attribute for an arbitrary sample. Assuming that a user prefers a balanced distribution across elements of t, a simple fairness criterion can be defined as:

$$E_{z\sim P_{sample}}[P(f(G(z))=0)]=E_{z\sim P_{sample}}[P(f(G(z))=1)]$$

The fairness criterion as expressed above states that, under random input samples, the deep generative model (G) is expected to produce outputs which satisfy the property represented by 0 and the property represented by 1 with equal probability.

In another embodiment, a fairness criterion is a sample-defined user criterion. The sample-defined user criterion may involves using pre-labelled samples to train an ad-hoc classifier that can subsequently be used to assess fairness; for example, an ad-hoc classifier which predicts "skin tone" is trained and used for assessing fairness of samples. Alternatively, the sample-defined user criterion may involves by merely comparing (empirically) the distributional statistics of the sample distribution and the desired target distribution; for example, a user may provide a small set of samples of "smiling faces" which are uniformly distributed across a criterion like skin tone. In such a case, system 100 for assessing fairness of a deep generative model can compare the sample mean, median, or other statistics; alternatively, system 100 can use unsupervised techniques to compare clusters across the two distributions.

Fairness assessor 110 assesses the fairness of pretrained deep generative model 150, as per user defined fairness criterion 140. For instance, fairness assessor 110 samples from pretrained deep generative model 150; fairness assessor 110 uses a classifier to evaluate the fairness or explore the latent space to evaluate fairness.

In one embodiment, fairness assessor 110 assesses the samples with a classifier. In a scenario where an externally sourced classifier is available to help assign protected attributes, pretrained deep generative model 150 may be probed for producing few thousands of samples and the classifier can be used to statistically assess fairness properties of the produced samples. Any classical machine learning classifier can be embodied in fairness assessor 110.

In another embodiment, fairness assessor 110 traverses the latent space. In order to assess the fairness with respect to the latent space, fairness assessor 110 can explore the neighborhood of different samples. Geometric properties can be used to evaluate whether there are biases in a particular direction or whether the fairness is preserved in certain subspaces or regions within the latent space. Often, pretrained deep generative model 150 incorporates a structured input where a part of the input is fed via a random seed while the other part is defined by attributes (e.g., "smile" or "glasses" in human portraits). In such cases, other techniques can be used for fairness assessment. For example, fairness assessor 110 can assess group fairness with respect to each of these attributes. Given structured inputs, fairness assessor 110 can also compare the output of pretrained deep generative model 150 for two different conditional inputs for a variety of random seeds.

System 100 for assessing fairness of a deep generative model further includes deep generative model modifier 120. Given information generated by fairness assessor 110, deep generative model modifier 120 analyzes changes needed to be made to pretrained deep generative model 150 and ensures pretrained deep generative model 150 to meet user defined fairness criterion 140. Deep generative model modifier 120 may apply some of these changes directly to pretrained deep generative model 150.

System 100 for assessing fairness of a deep generative model has output 160. Output 160 includes fairness report 170. Fairness report 170 is generated by fairness assessor 110. In fairness report 170, fairness assessor 110 summarizes the fairness assessment done by fairness assessor 110. Output 160 further includes recommendations 180 for modifying the deep generative model. Recommendations 180 is generated by deep generative model modifier 120. In recommendations 180, deep generative model modifier 120 provides a user with recommendations for modifying pretrained deep generative model 150 to meet user defined fairness criterion 140. Recommendations 180 may be used by the user to manually modify pretrained deep generative model 150. Output 160 further includes updated deep generative model 190. Updated deep generative model 190 is generated by deep generative model modifier 120. Deep generative model modifier 120 applies all or a subset of recommendations 180 to modify pretrained deep generative model 150. Through the modifications, deep generative model modifier 120 generates updated deep generative model 190 and improves the fairness of the generation process of the deep generative model.

In one embodiment, deep generative model modifier 120 recommends to reweight inputs of pretrained deep generative model 150. The inputs to pretrained deep generative model 150 provide one means to modify the output distributions. One simple strategy to ensure fairness is to reconfigure the input distribution as per user defined fairness criterion 140. For example, if the initial distribution is standard normal which led to imbalance classes within the output, deep generative model modifier 120 may prescribe a new reweighted distribution such as a mixture of Gaussians to satisfy the user criterion.

In another embodiment, deep generative model modifier 120 retrains the parameters of pretrained deep generative model 150. Deep generative model modifier 120 can retrain parts of the architecture of deep generative model modifier 120 or introduce new architecture components to ensure the fairness criterion to be satisfied. In the traditionally trained deep generative model modifier 120, initial layers help in disentangling the latent space while the later ones help improve the quality of generated samples. Therefore, deep generative model modifier 120 may retrain the selective layers, such as the ones responsible for disentangling features to reconfigure the latent space. When such flexibility is not readily available, deep generative model modifier 120 may include additional layers as a preprocessing module to achieve the same goal.

Figure 2:
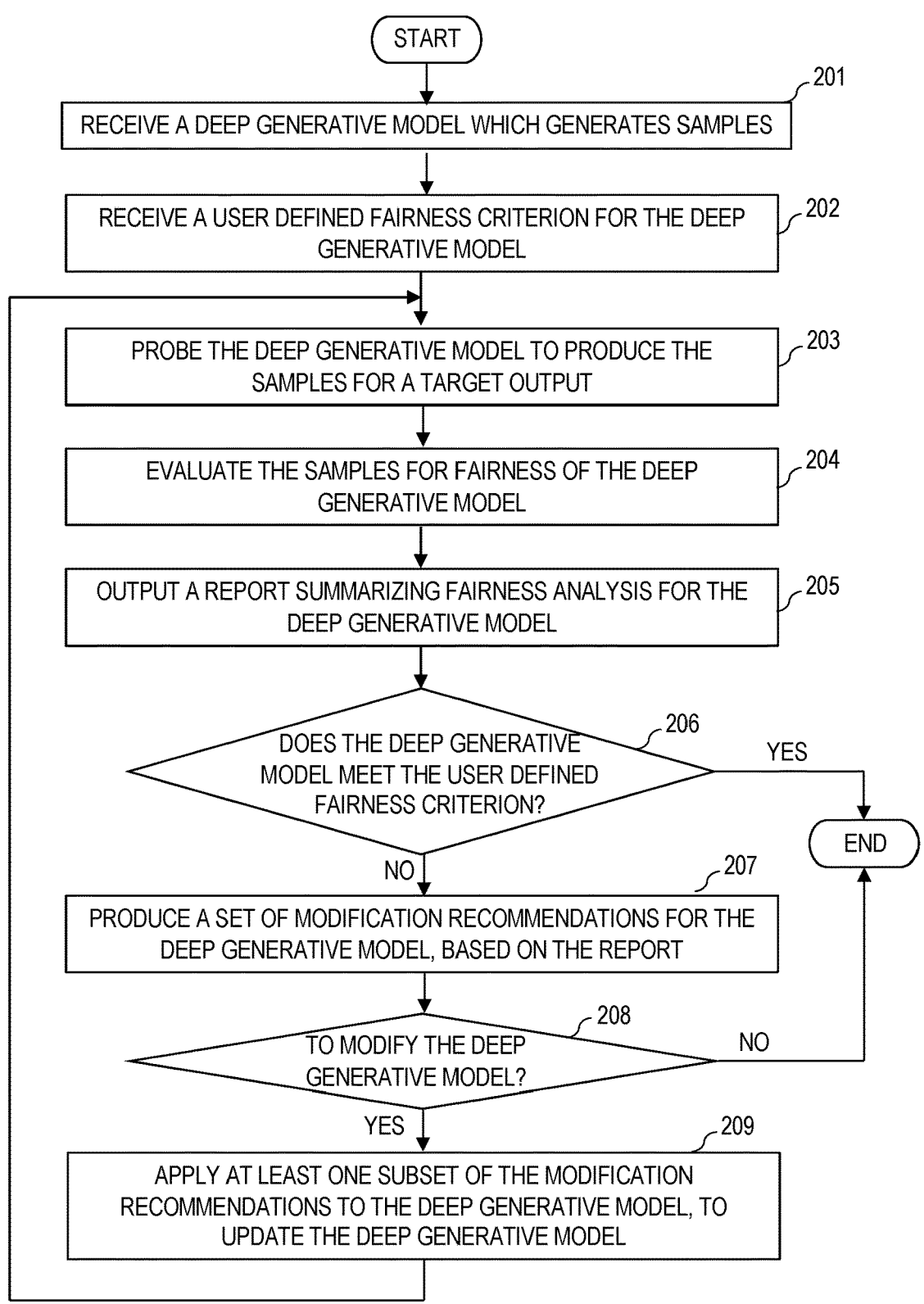
FIG. 2 is a flowchart showing operational steps for assessing fairness of a deep generative model, in accordance with one embodiment of the present invention.

FIG. 2 is a flowchart showing operational steps for assessing fairness of a deep generative model, in accordance with one embodiment of the present invention. The operational steps are implemented by a system (e.g., system 100 shown in FIG. 1) for assessing fairness of a deep generative model. The system for assessing fairness of a deep generative model is hosted by one or more computing devices or servers. A computing device or server is described in more detail in later paragraphs with reference to FIG. 3. The operational steps may be implemented in a cloud computing environment. The cloud computing environment is described in more detail in later paragraphs with reference to FIG. 4 and FIG. 5.

At step 201, the one or more computing devices or servers receive a deep generative model which generates samples. In the embodiment shown in FIG. 1, fairness assessor 110 in system 100 (hosted by the one or more computing devices or servers) receives pretrained deep generative model 150.

At step 202, the one or more computing devices or servers receive a user defined fairness criterion for the deep generative model. The user defined fairness criterion may specify some target output, for example, generation of samples of MRI images with tumor or generation of samples which are fair with respect to a certain group of patients. In the embodiment shown in FIG. 1, fairness assessor 110 in system 100 (hosted by the one or more computing devices or servers) receives user defined fairness criterion 140.

At step 203, the one or more computing devices or servers probe the deep generative model to produce the samples for a target output. In the embodiment shown in FIG. 1, fairness assessor 110 probes pretrained deep generative model 150 to produce the samples.

At step 204, the one or more computing devices or servers evaluate the samples for fairness of the deep generative model, according to the user defined fairness criterion. In the embodiment shown in FIG. 1, fairness assessor 110 evaluates the samples produced at step 203.

At step 205, the one or more computing devices or servers output a report summarizing fairness analysis for the deep generative model. In the embodiment shown in FIG. 1, fairness assessor 110 outputs fairness report 170 which summarizes the fairness assessment done by fairness assessor 110.

At step 206, the one or more computing devices or servers determine whether the deep generative model meets the user defined fairness criterion. In the embodiment shown in FIG. 1, deep generative model modifier 120 implements this step. In response to determining that the deep generative model meets the user defined fairness criterion (YES branch of decision block 206), the one or more computing devices or servers end the operational steps.

In response to determining that the deep generative model does not meet the user defined fairness criterion (NO branch of decision block 206), at step 207, the one or more computing devices or servers produce a set of modification recommendations for the deep generative model, based on the report. Given the report obtained at step 205, the one or more computing devices or servers analyzes the deep generative model and produces a set of modification recommendations which help deploy the deep generative model as per the user fairness criterion. The one or more computing devices or servers recommend to reweight inputs of the deep generative model. Alternatively, the one or more computing devices or servers recommend to retrain parts of the deep generative model or include additional parameters for disentangling latent vectors as per user criterion. In the embodiment shown in FIG. 1, deep generative model modifier 120 receives information generated by fairness assessor 110 and recommends changes needed to be made to pretrained deep generative model 150 to meet user defined fairness criterion 140.

At step 208, the one or more computing devices or servers determine whether to modify the deep generative model. The one or more computing devices or servers may determine whether owners of the deep generative model permit the modification of the deep generative model. In the embodiment shown in FIG. 1, deep generative model modifier 120 determines whether to modify the deep generative model.

In response to determining that the deep generative model is to be modified (YES branch of decision block 208), at step 209, the one or more computing devices or servers apply at least one subset of the modification recommendations to the deep generative model, to update deep generative model. In the embodiment shown in FIG. 1, deep generative model modifier 120 applies all or a subset of recommendations 180 to pretrained deep generative model 150 and generates updated deep generative model 190. In response to determining that the deep generative model is not to be modified (NO branch of decision block 208), the one or more computing devices or servers end the operational steps.

The one or more computing devices or servers iterate steps 203-209. The one or more computing devices or servers iterate evaluation of the samples and modification of the deep generative model until the deep generative model meets the user defined fairness criterion.

Figure 3:
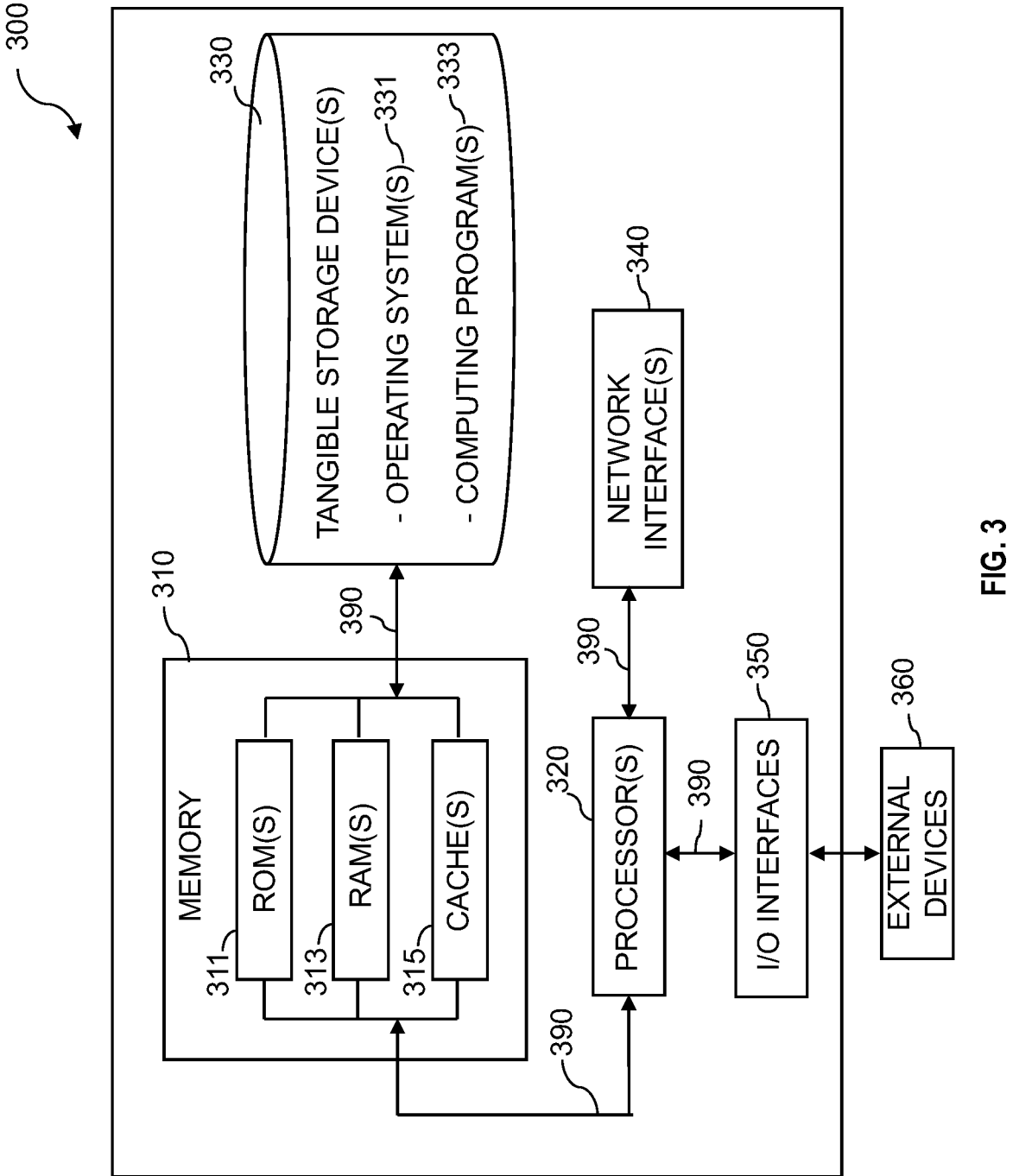
FIG. 3 is a diagram illustrating components of a computing device or server, in accordance with one embodiment of the present invention.

FIG. 3 is a diagram illustrating components of computing device or server 300, in accordance with one embodiment of the present invention. It should be appreciated that FIG. 3 provides only an illustration of one implementation and does not imply any limitations; different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, con-figuration data for integrated circuitry, or either source code or object code written in any combination of one or more programming languages, including an object oriented pro-gramming language such as Smalltalk, C++, or the like, and procedural programming languages, such as the C program-ming language or similar programming languages. The computer readable program instructions may execute entirely on the user's computer, partly on the user's com-puter, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program prod-ucts according to embodiments of the invention. It will be understood that each block of the flowchart illustrations and/or block diagrams, and combinations of blocks in the flowchart illustrations and/or block diagrams, can be imple-mented by computer readable program instructions.

These computer readable program instructions may be provided to a processor of a computer, or other program-mable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data process-ing apparatus, or other device to cause a series of operational steps to be performed on the computer, other programmable apparatus or other device to produce a computer imple-mented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods, and computer pro-gram products according to various embodiments of the present invention. In this regard, each block in the flowchart or block diagrams may represent a module, segment, or portion of instructions, which comprises one or more executable instructions for implementing the specified logi-cal function(s). In some alternative implementations, the functions noted in the blocks may occur out of the order noted in the Figures. For example, two blocks shown in succession may, in fact, be accomplished as one step, executed concurrently, substantially concurrently, in a par-tially or wholly temporally overlapping manner, or the blocks may sometimes be executed in the reverse order, depending upon the functionality involved. It will also be noted that each block of the block diagrams and/or flowchart illustration, and combinations of blocks in the block dia-grams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, imple-mentation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
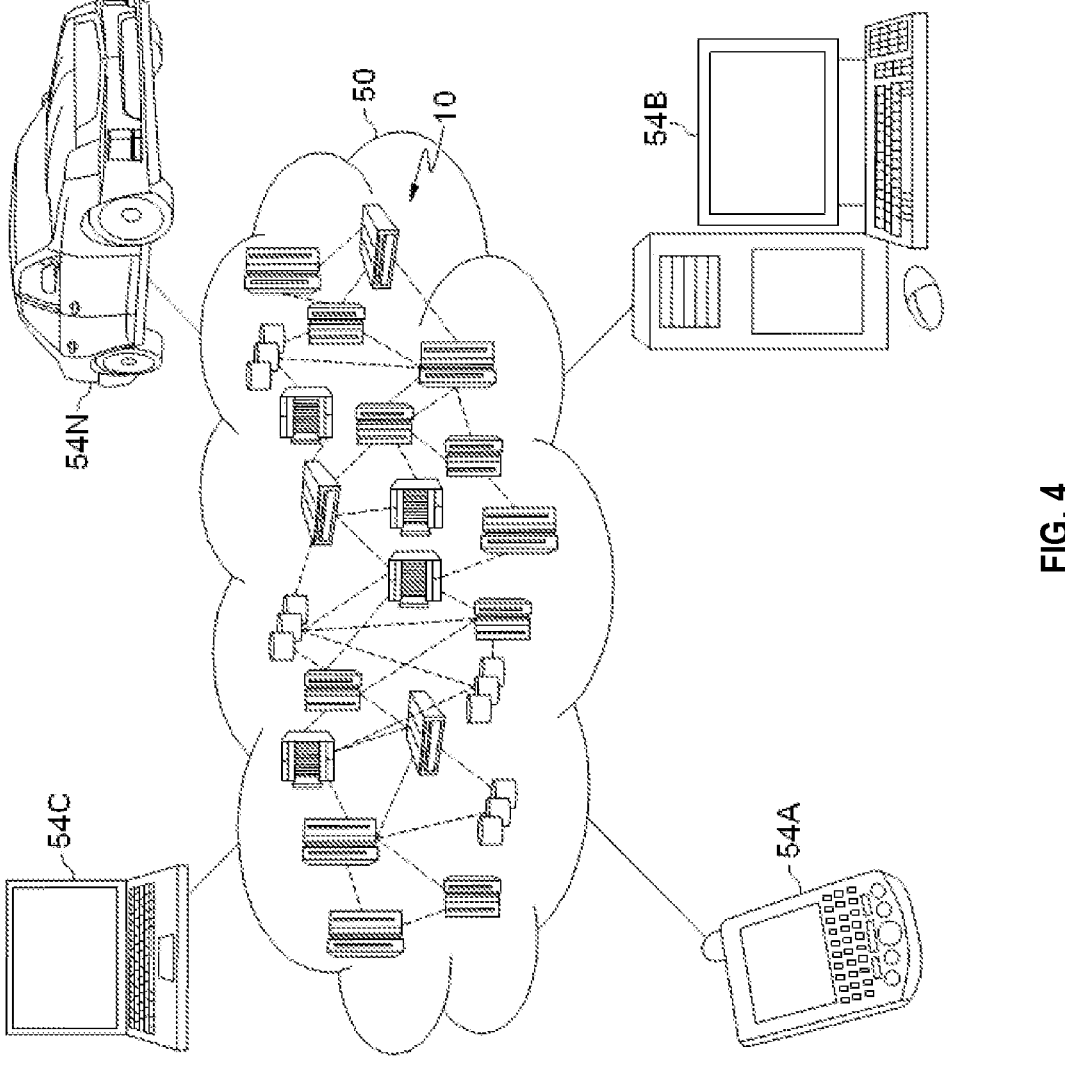
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
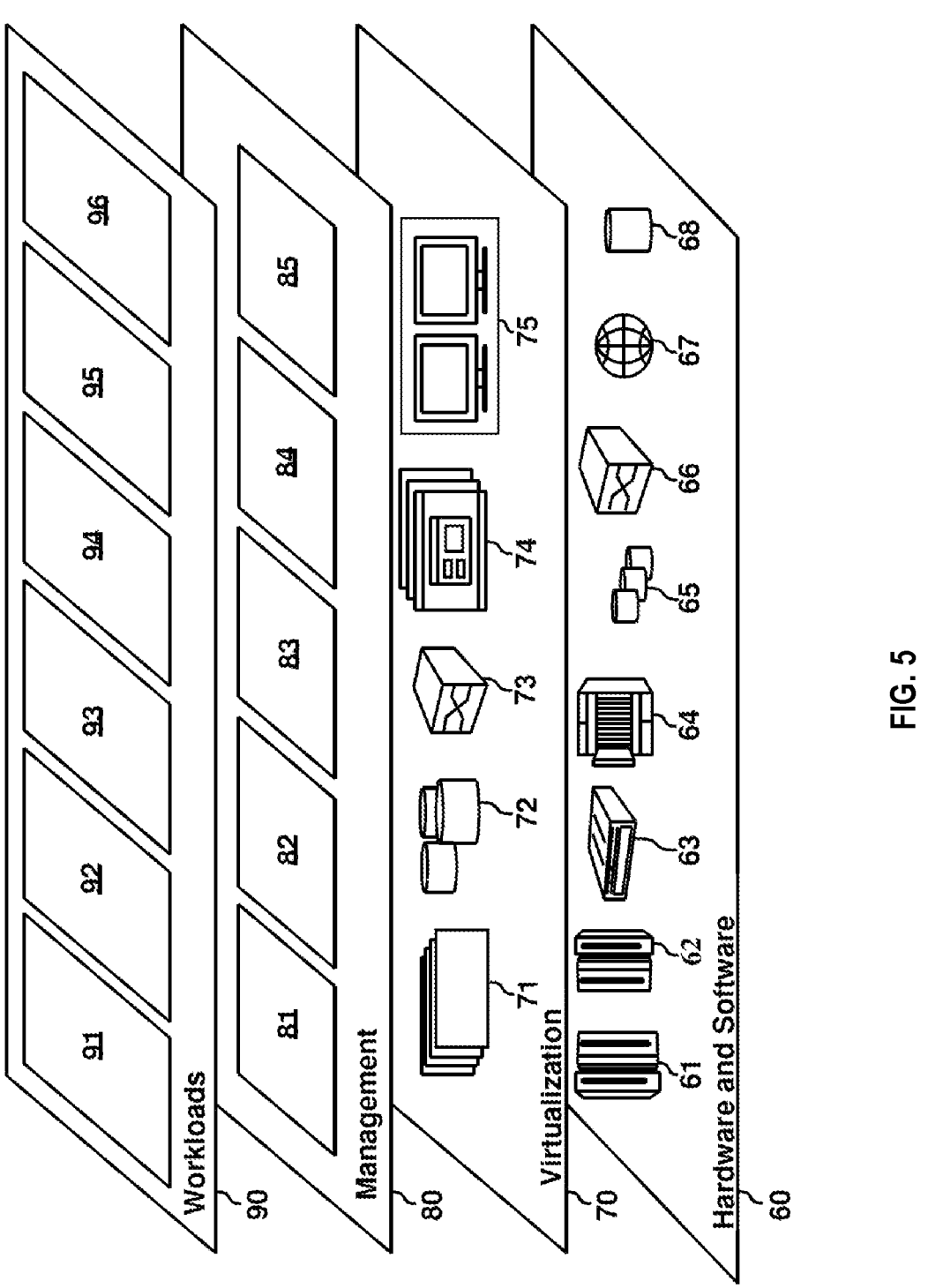
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of fairness assessment for deep generative models.

What is claimed is:

1. A computer-implemented method comprising:
receiving a user defined fairness criterion for a deep generative model;
probing the deep generative model to produce samples for a target output;
evaluating the samples for a fairness of the deep generative model according to the user defined fairness criterion, wherein an application programming interface provides access to a classifier that predicts distributional characteristics for a protected feature, wherein the classifier is trained using samples that are pre-labelled with the protected feature;
in response to determining that the deep generative model does not meet the user defined fairness criterion, producing a set of recommendations for modifying the deep generative model to meet the user defined fairness criterion;
in response to determining that the deep generative model is to be modified, applying at least one of the set of recommendations to the deep generative model; and
updating the deep generative model producing a set of recommendations for modifying the deep generative model to meet the user defined fairness criterion;
in response to determining that the deep generative model is to be modified, applying at least one of the set of recommendations to the deep generative model; and
updating the deep generative model.

2. The computer-implemented method of claim 1, further comprising:
iterating evaluation of the samples and modification of the deep generative model, until the deep generative model meets the user defined fairness criterion.

3. The computer-implemented method of claim 1, further comprising:
outputting a report summarizing fairness analysis for the deep generative model.

4. The computer-implemented method of claim 1, wherein the at least one of the set of recommendations is used by a user to modify the deep generative model.

5. The computer-implemented method of claim 1, further comprising:

determining whether an owner of the deep generative model permits modification of the deep generative model; and
in response to determining that the owner of the deep generative model permits the modification, applying the at least one of the set of recommendations to the deep generative model.

6. The computer-implemented method of claim 1, wherein the deep generative model is pretrained.

7. The computer-implemented method of claim 6, wherein the updating the deep generative model includes reweighting inputs of the deep generative model, wherein the reweighting the inputs comprises a mixture of Gaussians.

8. The computer-implemented method of claim 6, wherein the updating the deep generative model includes retraining selective initial layers that are responsible for disentangling features to reconfigure a latent space associated with the deep generative model.

9. A computer program product comprising a computer readable storage medium having program instructions embodied therewith, the program instructions executable by one or more processors, the program instructions executable to:
receive a user defined fairness criterion for a deep generative model;
probe the deep generative model to produce samples for a target output;
evaluate the samples for a fairness of the deep generative model, according to the user defined fairness criterion, wherein an application programming interface provides access to a classifier that predicts distributional characteristics for a protected feature, wherein the classifier is trained using samples that are pre-labelled with the protected feature;
in response to determining that the deep generative model does not meet the user defined fairness criterion, produce a set of recommendations for modifying the deep generative model to meet the user defined fairness criterion;
in response to determining that the deep generative model is to be modified, apply at least one of the set of recommendations to the deep generative model; and
update the deep generative model.

10. The computer program product of claim 9, further comprising the program instructions executable to:
iterate evaluation of the samples for the fairness and modification of the deep generative model, until the deep generative model meets the user defined fairness criterion.

11. The computer program product of claim 9, further comprising the program instructions executable to:
output a report summarizing fairness analysis for the deep generative model.

12. The computer program product of claim 9, wherein the at least one of the set of recommendations is used by a user to modify the deep generative model.

13. The computer program product of claim 9, further comprising:
determine whether an owner of the deep generative model permits modification of the deep generative model; and
in response to determining that the owner of the deep generative model permits the modification, apply the at least one of the set of recommendations to the deep generative model.

14. The computer program product of claim 9, wherein the deep generative model is pretrained.

15. A computer system comprising one or more processors, one or more computer readable tangible storage devices, and program instructions stored on at least one of the one or more computer readable tangible storage devices for execution by at least one of the one or more processors, the program instructions executable to:

receive a user defined fairness criterion for a deep generative model;

probe the deep generative model to produce samples for a target output;

evaluate the samples for a fairness of the deep generative model, according to the user defined fairness criterion, wherein an application programming interface provides access to a classifier that predicts distributional characteristics for a protected feature, wherein the classifier is trained using samples that are pre-labelled with the protected feature;

in response to determining that the deep generative model does not meet the user defined fairness criterion, produce a set of recommendations for modifying the deep generative model to meet the user defined fairness criterion;

in response to determining that the deep generative model is to be modified, apply at least one of the set of recommendations to the deep generative model; and update the deep generative model.

16. The computer system of claim 15, further comprising the program instructions executable to:

iterate evaluation of the samples for the fairness and modification of the deep generative model, until the deep generative model meets the user defined fairness criterion.

17. The computer system of claim 15, further comprising the program instructions executable to:

output a report summarizing fairness analysis for the deep generative model.

18. The computer system of claim 15, wherein the at least one of the set of recommendations is used by a user to modify the deep generative model.

19. The computer system of claim 15, further comprising:

determine whether an owner of the deep generative model permits modification of the deep generative model; and in response to determining that the owner of the deep generative model permits the modification, apply the at least one of the set of recommendations to the deep generative model.

20. The computer system of claim 15, wherein the deep generative model is pretrained.

* * * * *